Patented Sept. 29, 1931

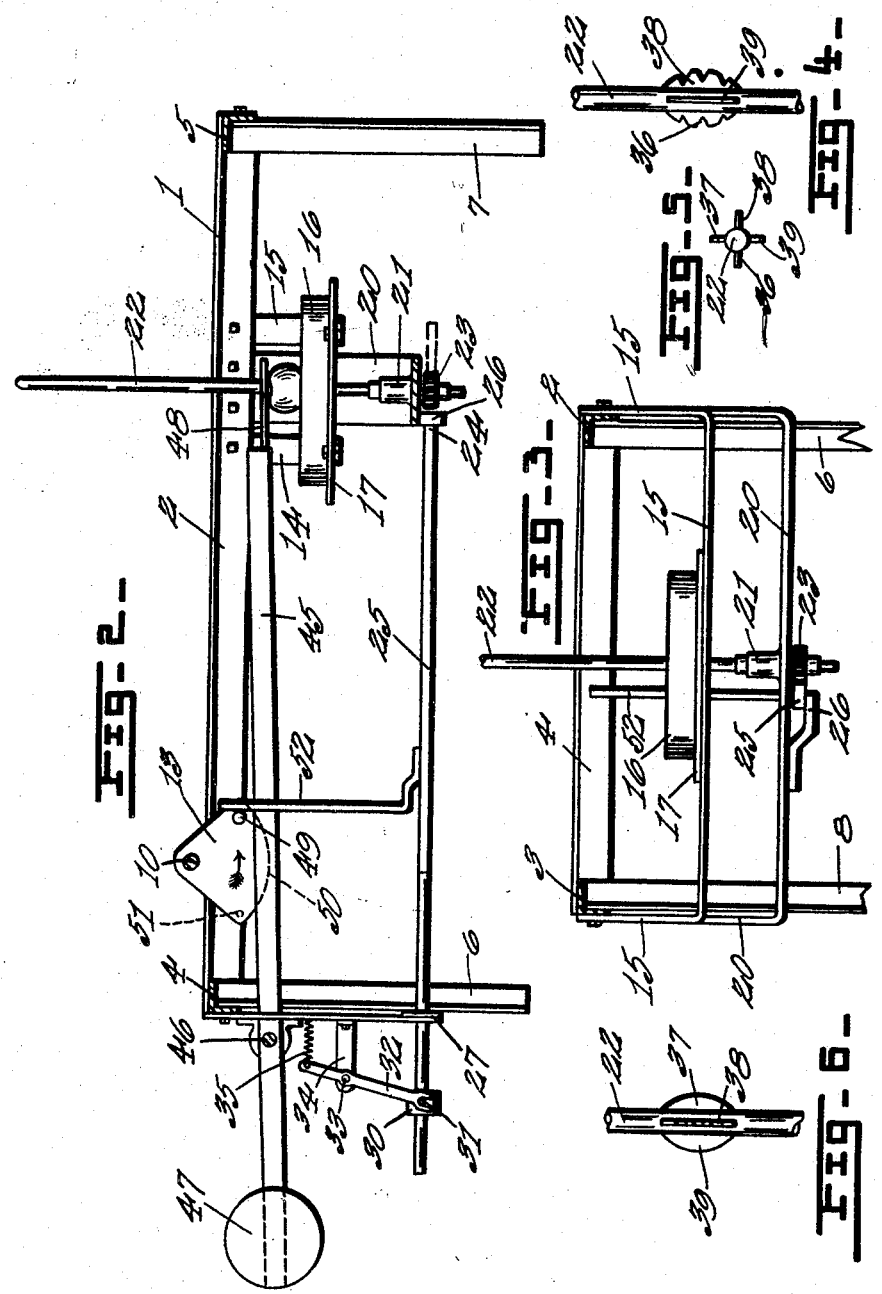

1,825,470

UNITED STATES PATENT OFFICE

JOHN MUSSELMAN, OF ORRTANNA, PENNSYLVANIA

SEED CELLING MACHINE

Application filed November 12, 1930. Serial No. 495,070.

The object of this invention is to provide a new and improved machine for removing the seed cells from apples and other fruit.

Another object of the invention is to provide a machine that will remove the seed cells without wasting the pulp of the apple in so doing.

Another object of the invention is to provide a machine that will cut a spherical opening in the center of the apple, the cutter being introduced into the center of the apple through the cylindrical hole made by the coring spoon.

Another object of the invention is to provide a machine by which the seed celling device does not rotate until the knives of it get to the center of the apple and then rotates to remove the seed cells, after which it again becomes stationary while the apple is removed from the seed celling device.

This and other objects of the invention will be illustrated in the drawings, described in the specifications and pointed out in the claims at the end thereof.

In the drawings:

Figure 2 is a vertical longitudinal section on the line 2x—2x of Figure 1.

Figure 3 is a vertical transverse section on the line 3x—3x of Figure 1.

Figure 4 is a detail view of the cutters that remove the seed cells and the shaft that carries them.

Figure 5 is a top plan view of the seed celling device.

Figure 6 is a detail view of the cutters that remove the seed cells and the shaft that carries them, the view being taken at right angles to the view shown in Figure 4.

In the drawings like reference numerals indicate like parts.

Figure 1:
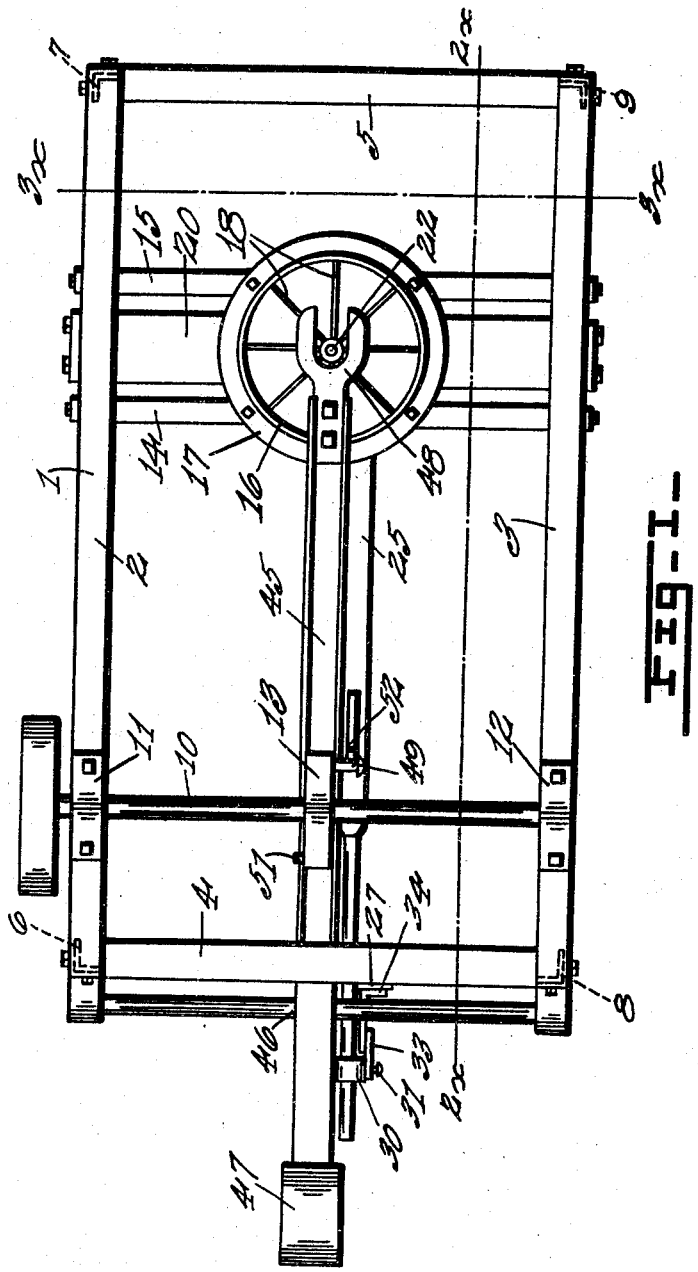
Figure 1 is a top plan view of the machine.

In the drawings reference numeral 1 indicates a rectangular frame composed of the bars 2 and 3 running lengthwise of the machine and the bars 4 and 5 extending transversely thereof. On each corner of the machine are the legs 6, 7, 8 and 9 on which the machine is supported. Extending transversely of the machine is the power shaft 10 mounted on suitable bearings 11 and 12 carried on the bars 2 and 3 of the frame. On this shaft is carried a cam 13. This shaft and cam rotate together continuously in the direction shown in the drawings. The purpose of this cam will presently be described. Mounted in the corner part of the machine are the U-shaped transverse bars 14 and 15. These bars 14 and 15 support a circular frame 16 between them having a flange 17 thereon by which it is fastened to the transverse bars 14 and 15. This frame carries radial knives 18, 18, eight of which are shown in Figure 1. This frame and its knives are stationary.

Between the bars 14 and 15 is located a U-shaped bar 20 on which is carried a bearing 21 which rotates an upright shaft 22. On the bottom of the shaft is carried a pinion 23 which is engaged by a rack 24 formed on the bar 25. This bar is at the forward end mounted on and slides in a bracket 26, by which it is held in engagement with the pinion 23. At the other end this bar slides in a bearing formed in the transverse bar 27 which is supported between the legs 6 and 8. The left-hand end of this bar is preferably made round or cylindrical and the right-hand end is rectangular, as shown in end elevation in Figure 3.

On the left-hand end of the bar 25 is provided a collar 30. On one side of this collar projects a pin 31 which is engaged by the forked end of the lever 32, which is pivotally mounted at 33 on the bracket 34. The upper end of this lever is normally pulled to the right by a spring 35.

The upright shaft 22 carries four knives 36, 37, 38 and 39. The knives 36 and 38 have teeth in them as shown in Figure 4 and the knives 37 and 39 have a continuous curved edge as shown in Figure 6. These knives are intended to remove the seed cells from the center of the fruit without disturbing the pulp on either side thereof.

In the machine is provided a lever 45 which is pivotally mounted at 46. On the left hand end is provided a weight 47, which normally holds the left hand end down and the right hand end up. On the right hand end is provided a fork 48 which is adapted to straddle the shaft 22. This lever 45 rocks up and down at the right hand end, being lifted by the downward pull of the weight 47. It is pushed down by the cam 13. It is understood that the bar 45 is channel shaped in cross section and the cam 13 engages in the channel. While the curved part 50 of the cam engages in the channel 45, the bar 45 is held down at rest in the position shown in Figure 2. In this position, it forces the apple down and clamps it on top of the stationary knives 18 carried in the circular frame 16. During this downward movement the upright shaft 22 is stationary and the knives 36, 37, 38 and 39 slit their way to the center of the apple. After the apple has been clamped in position on the stationary knives 18, the upright shaft 22 rotates to remove the seed cells.

Thereafter the pin 51 engages the upper edge of the channel and pushes the bar 45 down further, forcing the apple through the knives 18 shown in Figure 1. While the bar 45 is at rest in the position shown in Figure 2, the pin 49 engages with the bracket 52 carried on the bar 25 and pushes it forward causing the pinion 23 to rotate. The forward movement of the bar 25 is sufficient to rotate the shaft 22 through one and one-quarter turns and it is during this revolution that the seed cells are cut from the apple. Thereafter the pin 49 passes beyond the bracket 52 and the bar 25 is then released and is drawn to the left by the force of the spring 35. This causes the shaft to turn in the reverse direction quickly, after which the lever 45 operates to push the apple through the knives, cutting it into eight pieces.

It will be understood that the apple is placed on the shaft 22 after it has been peeled and cored. The coring spoon of the apple paring machine cuts a cylindrical hole through the apple and the core of the apple is removed thereby, in the way that is ordinarily done with paring machines. This leaves a cylindrical hole in the apple through which the shaft 22 can pass, as the apple is threaded over the shaft and when the apple is threaded over the shaft the fork 48 on the right hand end of the bar 45 is raised high enough to permit the apple to pass by the fork and rest on the knives 18. Thereafter the bar 45 comes down and the fork engages the apple and pushes it slightly on the stationary knives 18 to hold it against rotation. These stationary knives also serve to hold the apple against splitting while the shaft is rotating to remove the seed cells. During this time the shaft 22 is stationary and the knives slit through to the center of the apple as the apple is forced down after which the shaft 22 turns to remove the seed cells with the knives 36—39 inclusive.

Thereafter the shaft 22 turns back to its original position causing the knives to have a scraping or cleaning effect on the inside of the apple after which the bar 45 moves down further, forcing the apple through the stationary knives 18. Then the bar 45 raises again to permit the insertion of another apple. Each succeeding apple as it is pushed through the knives pushes the preceding apple through the knives and completes the slicing of the apple after the seed cells have been removed.

I claim:

1. In a seed celling machine the combination of a shaft, a plurality of knife blades fastened to said shaft in one zone, said knives being adapted to slit edgewise through the apple to the zone of the seed cells, a cam rack and pinion for rotating the shaft intermittently to cause the knives to remove the cells, and then to hold the shaft and knives stationary and means to push the apple along the shaft while stationary to make room for another apple.

2. In a seed celling machine, the combination of a stationary ring, knives arranged radially in the said ring, a shaft mounted centrally in said ring and adapted to rotate, a plurality of knives projecting radially from said shaft above said stationary knives, said shaft being adapted to receive a cored apple thereon, means for pushing the apple down along the said shaft and causing the knives on the shaft to slit through the apple to the zone of the seed cells while the shaft and knives are stationary, means for then rotating the shaft and knives to remove the seed cells, means for thereafter holding the shaft and knives stationary and means to push the apple down along the shaft and knives thereon and through the first named set of stationary knives.

3. In a seed celling machine, the combination of a stationary ring, knives mounted radially in said ring, a shaft mounted centrally in said ring, and extending above and below it, a plurality of knives projecting radially from said shaft above said stationary knives a pinion on the bottom of said shaft, a rack engaging said pinion, a cam for moving said rack in one direction and then release it and a spring for moving the rack in the reverse direction, whereby said shaft is caused first to turn in one direction and then in the other direction.

4. In a seed celling machine, the combination of a stationary ring, knives mounted radially in said ring, a shaft mounted centrally in said ring and extending above and below it, a pinion on the bottom of said shaft, a rack engaging said pinion, a cam for moving said rack in one direction and then release it and a spring for moving the rack in the reverse direction whereby said shaft is caused first to turn in one direction and then in the other direction, a plurality of knives projecting radially from said shaft above said stationary knives, said shaft being adapted to receive a cored apple thereon, said knives being adapted to slit their way up through the apple to the zone of the seed cells before the shaft is rotated and after the shaft has been rotated, being adapted to slit their way up through the rest of the apple as the apple is pushed down along the shaft.

5. In a seed celling machine, the combination of a stationary ring, knives arranged radially in the said ring, a shaft mounted centrally in said ring and adapted to rotate, a plurality of knives projecting radially from said shaft above said stationary knives, said shaft being adapted to receive a cored apple thereon, means for pushing the apple down along the said shaft and causing the knives on the shaft to slit through the apple to the zone of the seed cells, while the shaft and knives are stationary, said means serving to hold the apple on the first named knives and keep it from rotating with the shaft, means for then rotating the shaft and knives for removing the seed cells, means for thereafter holding the shaft and knives stationary, said first named means then operating to push the apple down along the shaft and the knives thereon and through the first named set of stationary knives.

6. In a seed celling machine, the combination of a stationary ring, knives mounted radially in said ring, a shaft mounted centrally in said ring, and extending above and below it, a plurality of knives projecting radially from said shaft above said stationary knives, a pinion on the bottom of said shaft, a rack engaging said pinion, a cam for moving said rack in one direction and then release it and a spring for moving the rack in the reverse direction whereby said shaft is caused first to turn in one direction and then in the other direction, an arm mounted to swing in said machine, said cam operating to engage said arm and push it down to a predetermined point, a fork on the end of said arm adapted to engage an apple and push it down upon said knives and hold it there stationary for a predetermined time, said cam then operating to push said arm further and push the apple through said stationary knife.

7. In a seed celling machine, the combination of an intermittently rotating shaft, a plurality of knife blades fastened to said shaft in one zone, said knives being adapted to slit edgewise through the apple to the zone of the seed cells, means for rotating the shaft to cause the knives to remove the cells, means to hold the shaft and knives stationary and means to push the apple along the shaft while stationary to make room for another apple, two of said knives having a continuous edge thereon and the other knives having a series of teeth therein.

In testimony whereof I affix my signature.
JOHN MUSSELMAN.